United States Patent
Cohen

(10) Patent No.: US 9,489,438 B2
(45) Date of Patent: Nov. 8, 2016

(54) SYSTEMS AND METHODS FOR VISUALIZING MASTER DATA SERVICES INFORMATION

(71) Applicant: Ronen Cohen, Gesher Haziv (IL)

(72) Inventor: Ronen Cohen, Gesher Haziv (IL)

(73) Assignee: SAP SE, Walldorf (DE)

( * ) Notice: Subject to any disclaimer, the term of this patent is extended or adjusted under 35 U.S.C. 154(b) by 165 days.

(21) Appl. No.: 13/779,106

(22) Filed: Feb. 27, 2013

(65) Prior Publication Data

US 2014/0244673 A1     Aug. 28, 2014

(51) Int. Cl.
*G06F 17/30* (2006.01)
*G06F 7/00* (2006.01)

(52) U.S. Cl.
CPC ... *G06F 17/30563* (2013.01); *G06F 17/30569* (2013.01)

(58) Field of Classification Search
CPC .............. G06F 17/30569; G06F 17/30067; G06F 17/30286; G06F 17/30595; G06F 17/30961
USPC ....................................................... 707/756
See application file for complete search history.

(56) References Cited

U.S. PATENT DOCUMENTS

| | | | |
|---|---|---|---|
| 6,820,135 B1* | 11/2004 | Dingman | G06F 17/30569 707/999.101 |
| 7,007,029 B1* | 2/2006 | Chen | G06F 17/30592 |
| 2005/0138483 A1* | 6/2005 | Hatonen | G06F 11/3466 714/45 |
| 2006/0136461 A1* | 6/2006 | Lee | G06Q 10/00 |
| 2009/0105984 A1* | 4/2009 | Wen | G06F 17/30572 702/127 |
| 2009/0234826 A1* | 9/2009 | Bidlack | G06F 17/30489 |
| 2011/0283231 A1* | 11/2011 | Richstein | G06F 3/0488 715/810 |
| 2013/0073518 A1* | 3/2013 | Srivastava et al. | 707/607 |

* cited by examiner

*Primary Examiner* — Usmaan Saeed
*Assistant Examiner* — Raquel Perez-Arroyo
(74) *Attorney, Agent, or Firm* — Buckley, Maschoff & Talwalkar LLC

(57) ABSTRACT

According to some embodiments, a processor may receive an original set of records and automatically transform the original set of records into a transformed set of records. The processor may also generate a visualization display including both a first graphical representation associated with the original set of records and a second graphical representation associated with the transformed set of records.

18 Claims, 10 Drawing Sheets

SYSTEMS AND METHODS FOR VISUALIZING MASTER DATA SERVICES INFORMATION

FIELD

Some embodiments relate to master data management. More specifically, some embodiments provide systems and methods for visualizing master data services information.

BACKGROUND

A business or enterprise may store information about various entities in the form of electronic records. For example, a company might have a customer database where each row in the database represents a record containing information about a particular customer (e.g., the customer's name, address, billing information, and purchase history). Moreover, different electronic records may actually be related to a single entity. For example, a first record for "Customer" and a second record for "Customer, Inc." might both be associated with the same customer. In some cases, it may be desirable to consolidate multiple records to create a data store that contains a single electronic record for each entity represented in the database. Such a goal might be associated with, for example, a master data management program.

The consolidation process in a master data management program may be a time consuming and error prone operation. For example, an algorithm might review records looking for potential duplicates. When a potential duplicate is found, the algorithm or human operator might determine the best way for the information to be combined. The effort and costs associated with such a process can be difficult to justify, especially when a substantial number of records are involved. That is, a newly consolidated database might appear to a manager or supervisor as being substantially similar to a prior version that contained duplicate records.

Accordingly, a method and mechanism for accurately representing and/or depicting the merging of data records may be provided in accordance with some embodiments described herein.

DETAILED DESCRIPTION

A business or enterprise may store information about various entities in the form of electronic records. For example, a company might have a customer database where each row in the database represents a record containing information about a particular customer (e.g., the customer's name, address, billing information, and purchase history). For a number of different reasons, different electronic records may actually be related to a single entity. For example, in a typical heterogeneous information technology landscape, customer data may be authored in multiple different systems, and each system may define customers differently and in accordance with different business processes.

In such conditions, the unintentional creation of duplicate customer records across the information technology landscape is possible, and the ability to gain a single, accurate view of a particular customer and customer interactions may be limited (thus reducing the ability to perform trusted analytics).

Figure 1:
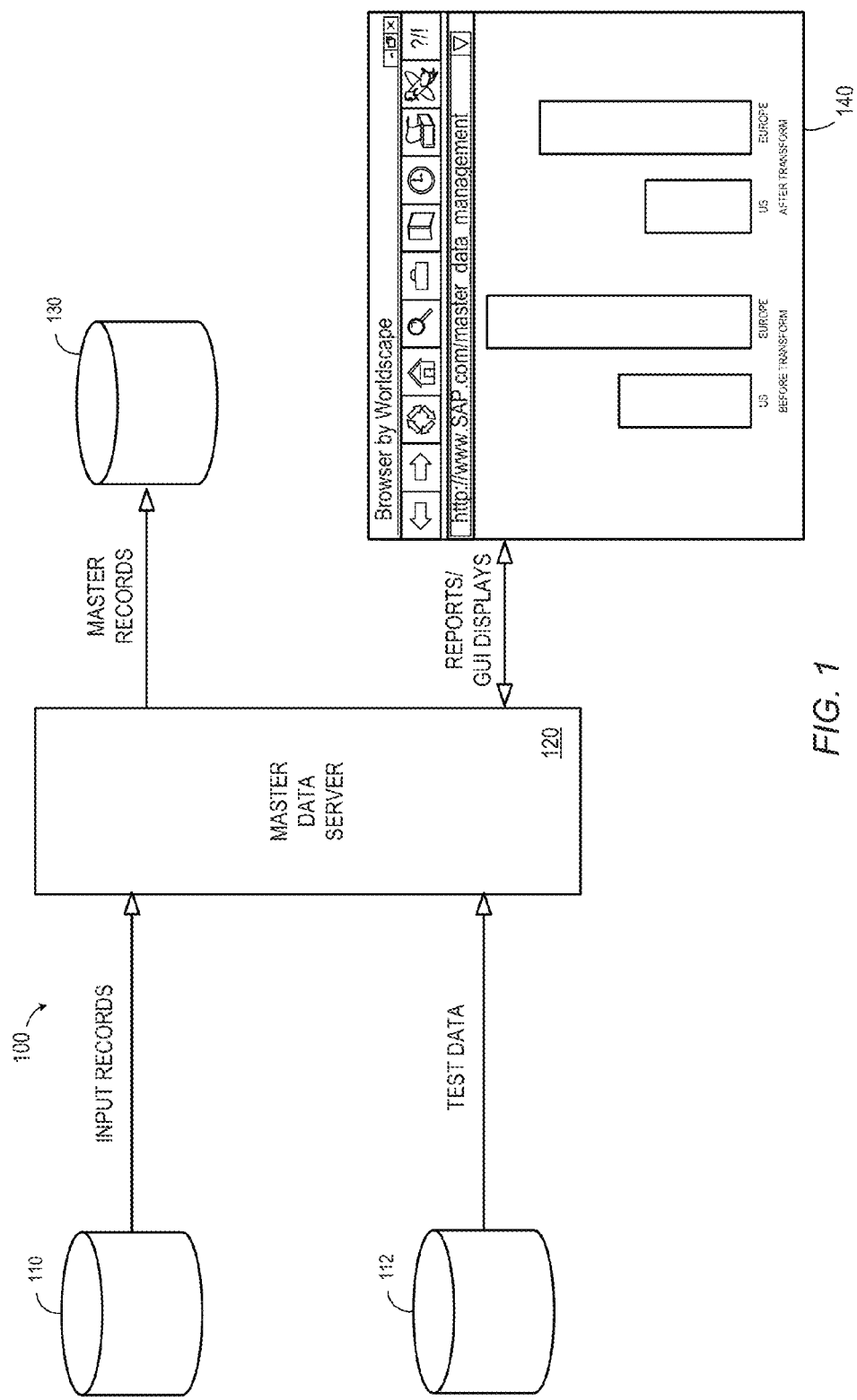
FIG. 1 is a block diagram of a system that might be associated with master data management according to some embodiments.

In a master data management consolidation process, data from multiple source systems may be cleansed and merged into a single "best" record representing an enriched single view of each customer. A data steward, who may be an employee responsible for the overall data quality in a master data services environment, may desire a visualization that summarizes the processes the data went through and the impact of those processes on sales data analysis. To help provide such visualization, FIG. 1 is a block diagram of a system 100 that might be associated with master data management according to some embodiments. A number of data sources 110, 112 may provide database records to a master data server 120. The master data server 120 may consolidate and enrich those records and store the resulting master records in a master record database 130. Moreover, according to some embodiments described herein, the master data server 120 may further generate and/or interact with reports and/or Graphical User Interface ("GUI") displays to facilitate understanding of the consolidation and/or enrichment processes.

Figure 2:
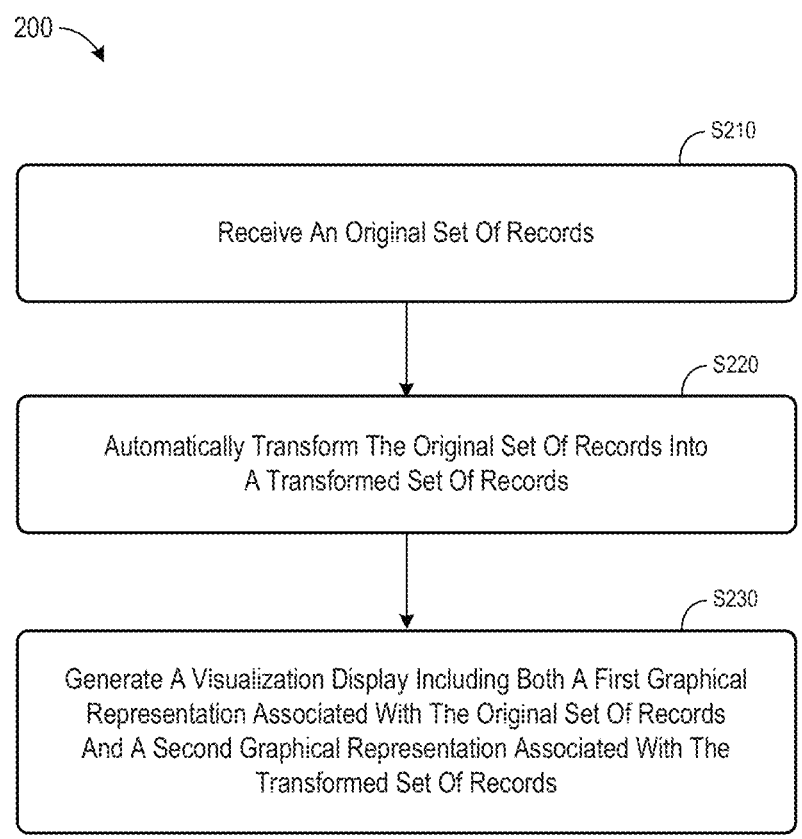
FIG. 2 is a flow diagram of a process in accordance with some embodiments.

The master data server 120 may operate in accordance with any of the embodiments described herein. For example, FIG. 2 is a flow diagram of a process 200 according to some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S210, an original set of records may be received. The original set of records might be received, for example, from a customer information platform. The original set of records include records might be received from a single data source or from a plurality of data sources.

At S220, the original set of records may be automatically transformed into a transformed set of records. As used herein, the term "automatically" may refer to an action or process that may be performed with little or no human intervention. The automatic transformation might be performed, for example, by a computer processor of a master data services platform. According to some embodiments, the transformation may be associated with a record consolidation process. For example, multiple records referring to a single entity might be combined into a single record. The transforming might also be associated with a record enrichment process. For example, supplemental information (e.g., a postal code) might be determined and added to each record.

At S230, a visualization display may be generated including both a first graphical representation associated with the original set of records and a second graphical representation associated with the transformed set of records. The generation of the display might be associated with a business user data analysis tool (e.g., a relative simple tool typically accessed by a business user). For example, an EXCEL® spreadsheet application from MICROSOFT CORPORATION® might be used to generate charts based on customer and/or sales data stored in a master data management system. According to some embodiments, the visualization display is updated in substantially real time (e.g., as records are consolidated).

Figure 3:
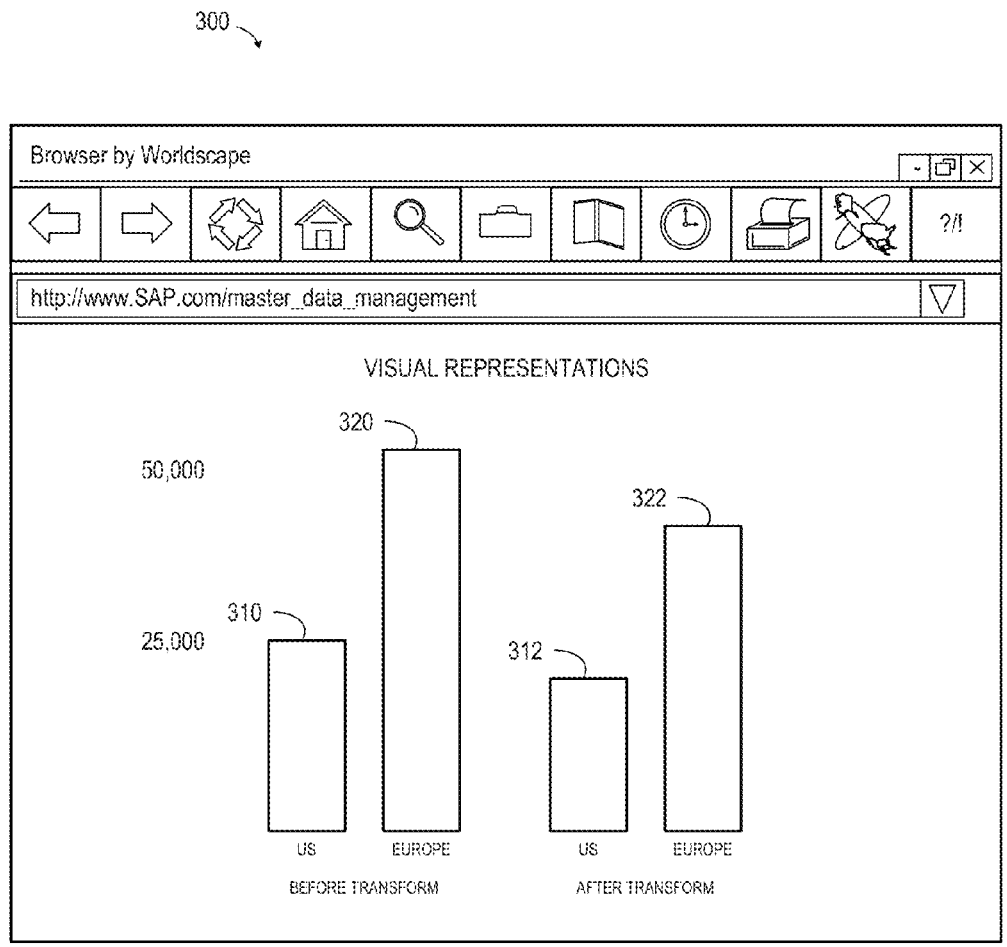
FIG. 3 illustrates an example of a visual representation display that might be provided in accordance with some embodiments.

Note that the first graphical representation and the second graphical representation might, according to some embodiments, each be divided into sub-representations associated with geographic locations. For example, FIG. 3 illustrates an example of a visual representation display 300 that might be provided in accordance with some embodiments. The display 300 includes a vertical bar chart showing a number of customers in the US before a transformation process is applied to a database 310 (e.g., approximately 25,000 customers or records). The display 300 similarly includes a bar representing a number of customers (or customer records) in Europe before the transformation process is applied to the database 320 (e.g., approximately 50,000 customers or records). Further, the display includes representations 312, 322 of US and European customers after the consolidation process has been applied to the database. In this way, the impact of the process on the data (e.g., the reduction of the number of records illustrated in FIG. 3) may be automatically visualized. According to some embodiments, indications of sales volume per region might be displayed in addition to, or instead of, a number of customer records. Note that while an overall amount of sales might not change as a result of the consolidation, the distribution across the different regions may change (e.g., due to address corrections), and this might lead to a new marketing decisions based on the new distribution of sales per region.

Figure 4:
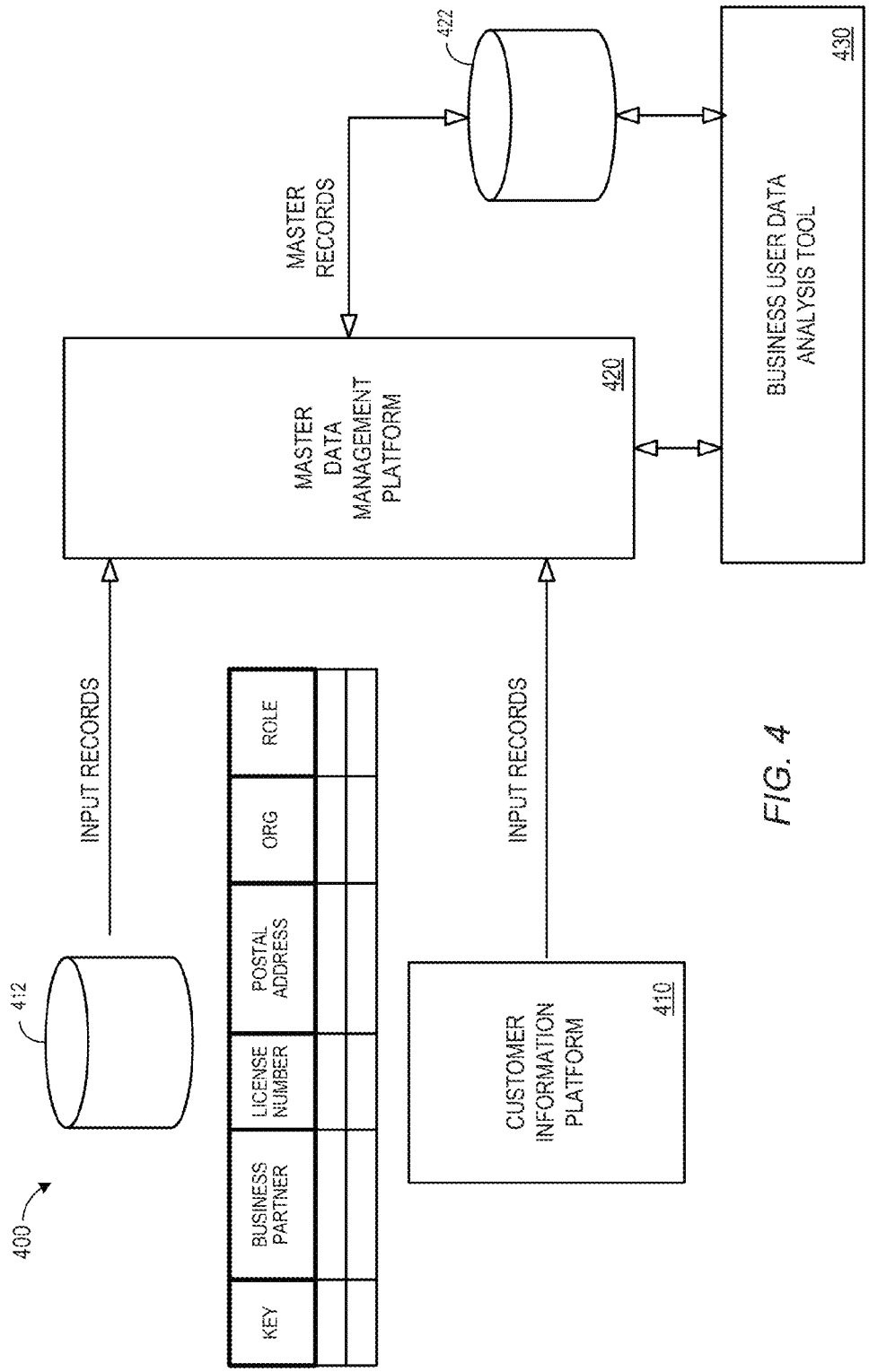
FIG. 4 is a block diagram of a master data management system according to some embodiments.

FIG. 4 is a block diagram of a master data management system 400 according to some embodiments. The system 400 includes a number of data sources 410, 412 storing records, each record containing a number of fields (e.g., a key number, business partner name, license number, and postal address). Different data sources 410, 412 may, for example, be associated with a customer information platform 410, such as a Customer Relationship Management ("CRM") platform and other business applications, including legacy applications. According to some embodiments, one or more data sources 410, 412 might be associated with an Enterprise Resource Planning ("ERP") system. Note that the records might be stored within physical tables of a database. The database may comprise a relational database such as SAP MaxDB, Oracle, Microsoft SQL Server, IBM DB2, Teradata and the like. As another example, the data sources 410, 412 might be associated with a multi-dimensional database, an eXtendable Markup Language ("XML") document, or any other structured data storage system. The physical tables may be distributed among several relational databases, dimensional databases, and/or other data sources.

A master data management platform 420 may receive input records from the various data sources 410, 412. For example, the master data management platform 420 might import the input records from a remote data source 410, 412 via HyperText Transport Protocol ("HTTP") communication or any other type of data exchange. The master data management platform 420 and/or data sources 410, 412 might be associated with, for example, Personal Computers (PC), servers, and/or mobile devices.

The master data management platform 420 may consolidate and/or merge the input records received from the data sources 410, 412 and store master records into a master database 422 in accordance with any of the embodiments described herein. For example, a human resources database and a sales representative database might both contain records about the same employee. Similarly, the human resources database itself might contain multiple entries associated with a single person (e.g., both "Jonathon Doe" and "John Doe" records). In either case, the master data management platform 420 might automatically consolidate the multiple records to create a single master record for that employee. Such a goal might be associated with, for example, a master data management program.

According to some embodiments, a consolidation of records in master data management is associated with a two phase process of (i) identifying potential duplicates and then (ii) merging the records into a single best representing instance of the record. Note that large sets of data might be extracted from multiple legacy systems into the master data management platform 420 and include some obvious, straight forward duplicates that need to (and can be) resolved and merged immediately after the data is imported into the master data management platform 420. In many cases, the duplicate detection will be straight forward, such as when it is based on a well-defined identifier that can't be interpreted in ambiguous ways. Examples of such identifiers include a Social Security Number for to identify individuals or a Global Trade Item Number ("GTIN") to detect duplicate materials.

In some cases, however, duplicate records may need to be merged into a single physical record, but conflicting data values exist among the different records. For example, one record might indicate a home address of "123 Main Street" while another record indicates a home address of "12 Main Street." According to some embodiments described herein, a rule based mechanism may facilitate consolidation in any conflict situation. Moreover, this logic may comprise a set of rules that automate and streamline the consolidation process in master data management. A business user data analysis tool 430 may exchange data with the master data management platform 420 and/or the master database 422 to create visual representations in accordance with any of the embodiments described herein.

Note that FIG. 4 represents a logical architecture according to some embodiments, and actual implementations may include more or different components arranged in other manners. Moreover, each system described herein may be implemented by any number of devices in communication via any number of other public and/or private networks. Two or more of devices of may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip® disk, magnetic tape, and solid state Random Access Memory (RAM) or Read Only Memory (ROM) storage units. Embodiments are therefore not limited to any specific combination of hardware and software.

Figure 5:
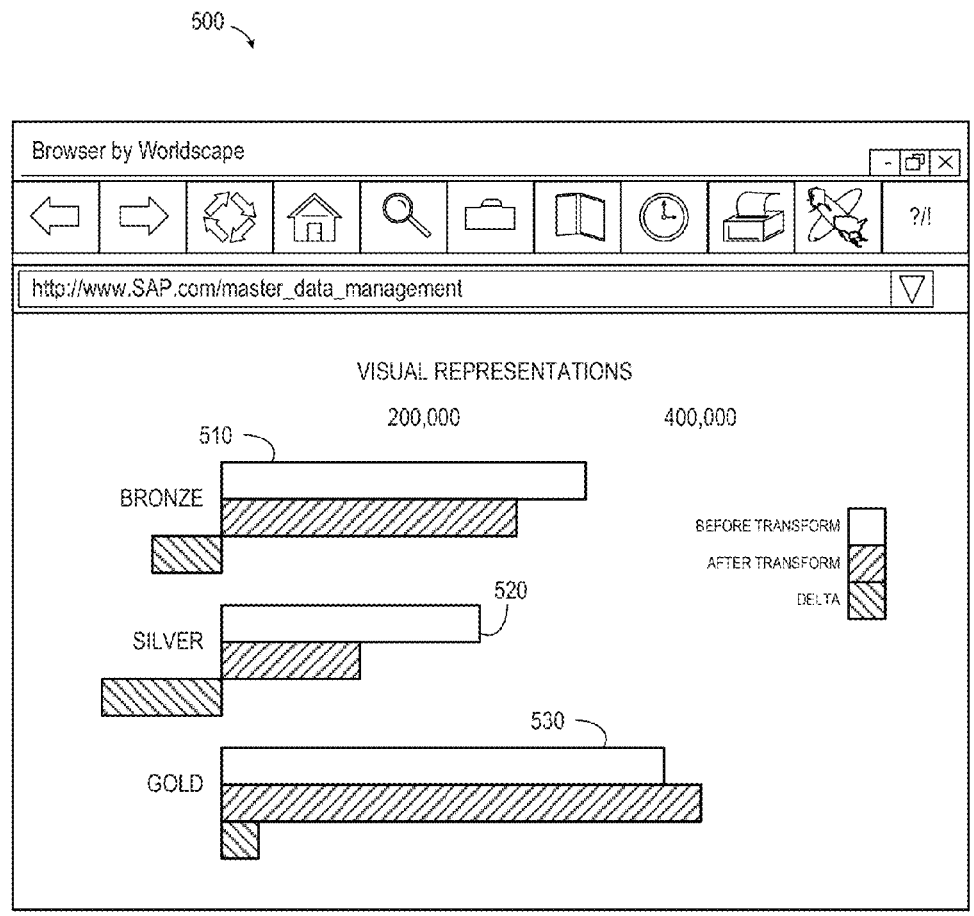
FIG. 5 illustrates another example of a visual representation display that might be provided in accordance with some embodiments.

The business user data analysis tool 430 may automatically create multiple graphical representations associated with the data both "before" and "after" a transformation process is executed. According to some embodiments, a first graphical representation and a second graphical representation may each be divided into sub-representations associated with customer levels. As used herein, a "customer level" may refer to, for example, a size, amount of sales, amount of profit, a number of purchase orders, etc. associated with a customer. FIG. 5 illustrates another example of a visual representation display 500 that might be provided in accordance with some embodiments. The display 500 includes horizontal bars 510 indicating a number of records associated with "bronze" level customers both before and after a consolidation process. According to this embodiment, a third bar is also included reflecting a "delta" change in the number of records for that customer level. Similarly, bars 520, 530 may be displayed for "silver" and "gold" level customers. Note that the number of records for gold level customers actually increased as a result of the consolidation process (the bars 530 reflect a positive delta). This might be because, for example, of mis-characterized bronze and silver records being correctly re-assigned as gold level. According to some embodiments, for each best record the system might display the sources from which it is composed from along with the sales amount. Moreover, a signal strength icon (similar to those used on wireless telephones) may be used to visualize the customer level before and after consolidation, and might indicate that as a result of merging duplicate instances of the same customer entity, the customer level has changed from a bronze to gold. Customer levels might be used to indicate an importance of the customer to a business organization.

Figure 6:
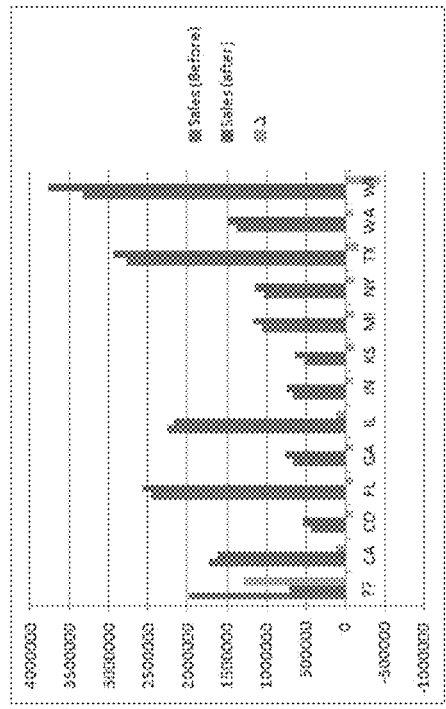
FIG. 6 illustrates data that might be provided in accordance with some embodiments.

FIG. 6 illustrates data 600 that might be provided in accordance with some embodiments. The data 600 includes input sales figures 610 broken down by region, including figures before and after a transformation process. Those input sales figures 610 may then be automatically converted into a graphical representation 620 of the information to be displayed to a data steward or other users.

Figure 7:
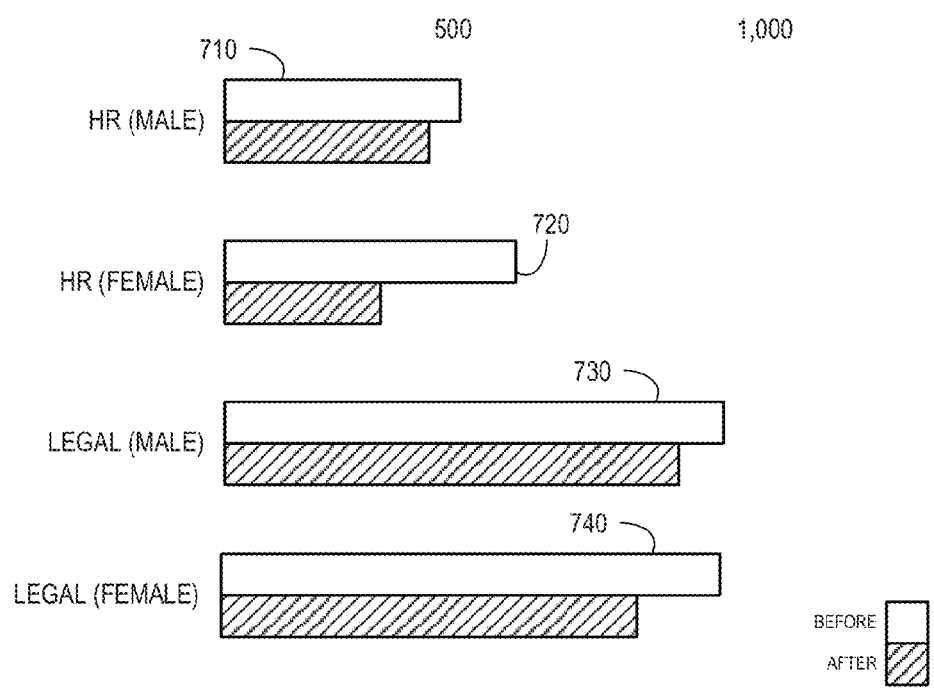
FIG. 7 illustrates still another example of a visual representation display that might be provided in accordance with some embodiments.

According to some embodiments, a first graphical representation (e.g., pre-transformation) and a second graphical representation (e.g., post-transformation) may each be divided into sub-representations associated with demographic attributes. For example, FIG. 7 illustrates still another example of a visual representation display 700 that might be provided in accordance with some embodiments. The display 700 includes horizontal bar charts reflecting a number of employee records in a Human Resources ("HR") database. For example, before and after numbers of HR department employees are displayed for both male 710 and female 720 records. Similarly, before and after numbers of legal department employees are displayed for both male 730 and female 740 records. Thus, attributes may be visualized together for both gender and occupation. The gender information might, for example, be refined based on a "title" attribute (e.g., "Mr." or "Ms.") and the occupation might be imported from an external source. When combined together, this information might create an insight that leads to a brand new marketing decision based on important and trusted demographic attributes.

Figure 8:
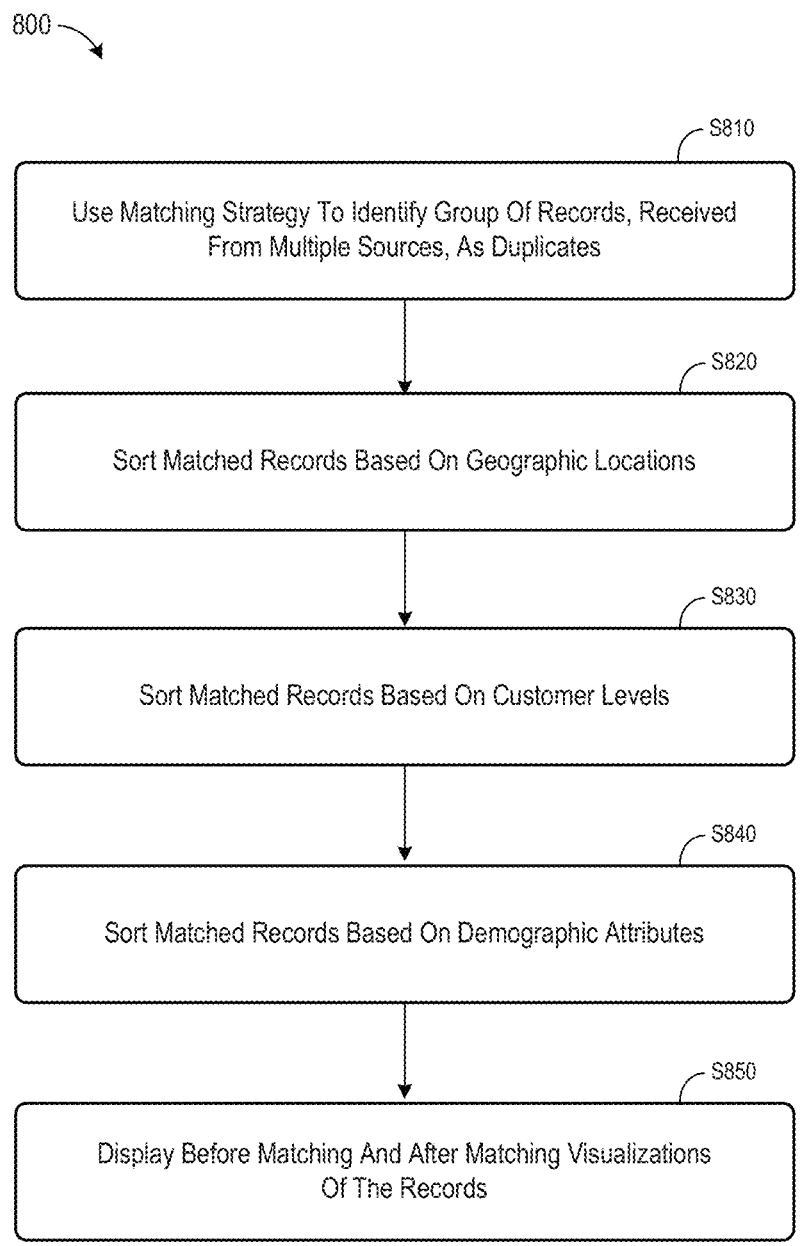
FIG. 8 is a flow diagram of a process according to one embodiment that might be implemented.

FIG. 8 is a flow diagram of a process 800 according to one embodiment that might be implemented. At 810, a matching strategy might be used to identify a group of records, received from multiple sources, as duplicates. At 820 the matched records may be sorted based on geographic locations. The matched records may further be sorted based on customer levels at 830 and based on demographic attributes at 840. After the sorting processes, before and after matching visualizations of the records may be graphically displayed to a data steward or other user at 850.

Figure 9:
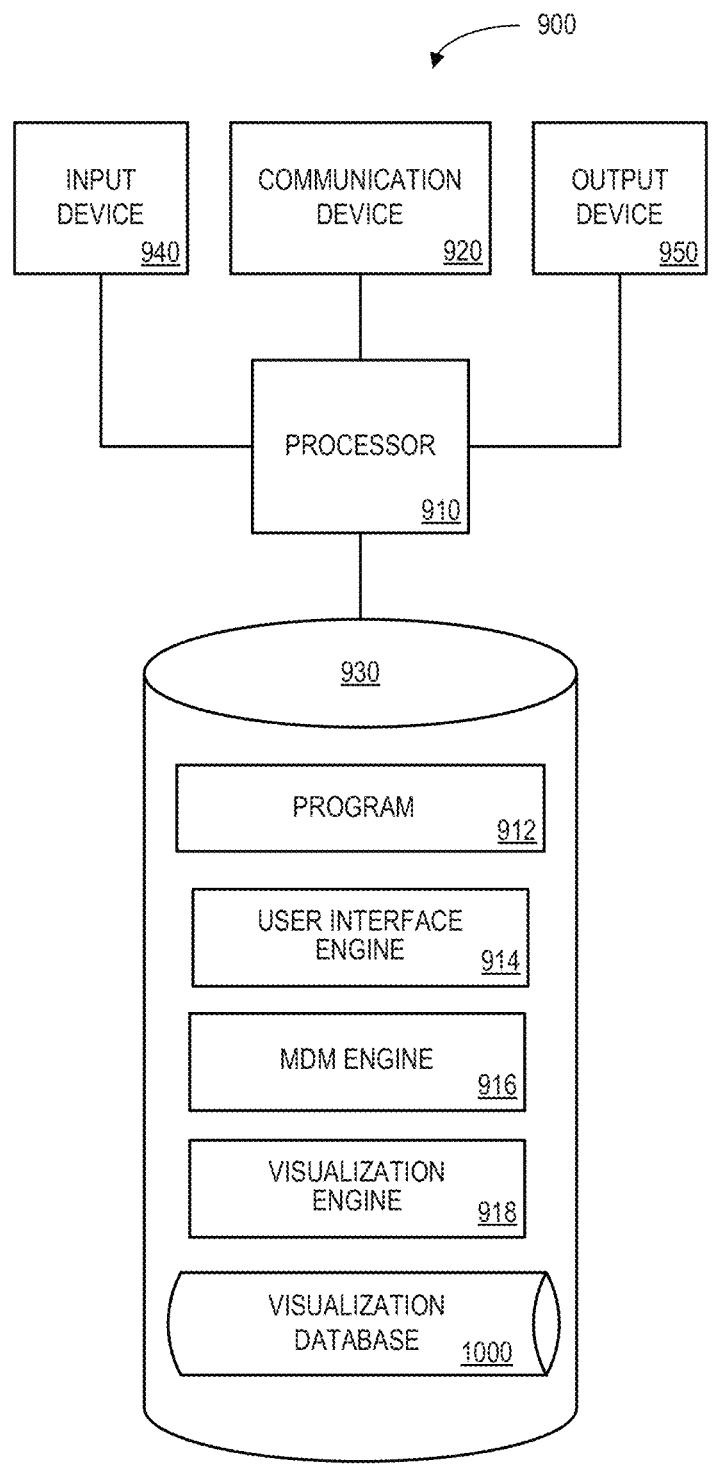
FIG. 9 is a block diagram of a system that might be associated with master data management according to another embodiment.

FIG. 9 is a block diagram overview of a master data server system or platform 900 according to some embodiments. The master data server platform 900 may be, for example, associated with any of the devices described herein. The master data server platform 900 comprises a processor 910, such as one or more commercially available Central Processing Units (CPUs) in the form of one-chip microprocessors, coupled to a communication device 920 configured to communicate via a communication network (not shown in FIG. 9). The communication device 920 may be used to communicate, for example, with one or more remote data sources, master databases, and/or operators. The master data server platform engine 900 further includes an input device 940 (e.g., a mouse and/or keyboard to enter records or rules) and an output device 950 (e.g., a computer monitor to display a user interface element and/or master data reports).

The processor 910 communicates with a storage device 930. The storage device 930 may comprise any appropriate information storage device, including combinations of magnetic storage devices (e.g., a hard disk drive), optical storage devices, and/or semiconductor memory devices. The storage device 930 stores a program 912, user interface engine application 914, master data management engine 916, and/or visualization engine 918 for controlling the processor 910. The processor 910 performs instructions of the programs 912, 914, 916, 918 and thereby operates in accordance with any of the embodiments described herein. For example, the processor 910 may receive an original set of records and automatically transform the original set of records into a transformed set of records. The processor 910 may also generate a visualization display including both a first graphical representation associated with the original set of records and a second graphical representation associated with the transformed set of records.

The programs 912, 914, 916, 918 may be stored in a compressed, uncompiled and/or encrypted format. The programs 912, 914, 916, 918 may furthermore include other program elements, such as an operating system, a database management system, and/or device drivers used by the processor 910 to interface with peripheral devices.

As used herein, information may be "received" by or "transmitted" to, for example: (i) the master data server platform 900 from another device; or (ii) a software application or module within the master data server platform 900 from another software application, module, or any other source.

In some embodiments (such as shown in FIG. 9), the storage device 930 stores a visualization database 1000 containing information about records received from data sources. One example of a database 1000 that may be used in connection with the master data server platform 900 will now be described in detail with respect to FIG. 10. Note that the databases described herein are examples, and additional and/or different information may be stored therein. Moreover, various databases might be split or combined in accordance with any of the embodiments described herein.

Figure 10:
FIG. 10 illustrates a portion of a visualization database according to some embodiments.

Referring to FIG. 10, a table is shown that represents a portion of the visualization database 1000 that may be stored at the master data server platform 900 according to some embodiments. The table may include, for example, entries associated with duplicate records that have been combined and/or merged. The table may also define fields 1002, 1004, 1006, 1008 for each of the entries. The fields 1002, 1004, 1006, 1008 may, according to some embodiments, specify: a record type 1002, a description 1004, a number of records 1006, and notes 1008. The information in the visualization database 1000 may be created and updated, for example, based on information received from data sources and/or master data management systems and services.

The record type 1002 may be, for example, an alphanumeric code associated with records and/or databases. The description 1004 might describe each record type 1002 (e.g., indicate a customer type and/or whether the data is associated pre-transform or post-transform information). The number of records 1006 might indicate how many records of that particular record type 1002 exist. The notes 1008 may further describe or annotate information about records that record type. The information in the visualization database 1000 may be used, for example, to generate charts and other representation of about the master data management system or service.

Note that the record consolidation rules and/or processes may employ various techniques. For example, according to some embodiments, a business partner name might represent an entity associated with the record. Note that the business partner names for different records might exhibit slight variations (e.g., informal differences such as "Dr." as compared to "Doctor" and/or errors such as typographical errors). A license number filed may store a number associated with the records, and a postal address might represent the mailing address of the entity. A health care organization filed might represent another party associated with the record, a role field might indicate a type of relationship between the parties, and a source system field might represent where the data originated.

Thus, some embodiments may provide a single, up-to-date and accurate representation of records within a master data management hub that can be shared across an information technology landscape with analytical as well as operational systems. In some consolidation processes, a group of identified duplicate records may be evaluated using a record level rule to select a master or "golden" record. Next, a field level rule might be used to modify the golden record. These particular record and field level rules are simply examples, and many other types of criteria could be used instead.

For example, record and/or field level rules might be associated with completeness. With respect to record level consolidation, the record with the highest number of populated fields might be selected as the master record. With respect to field level consolidation, the fields with the longest values might be selected to over-ride the values in the selected master data record.

As another example, record and/or field level rules might be associated with frequency. For example, the record that has the most frequently occurring combination of values across fields (e.g., pairs of fields) might be selected as the master record. Similarly, the most frequently occurring value could be selected as a field level rule. As still another example, record and/or field level rules might be associated with how recently data was updated. The most recently updated record might be selected as a master data record while the most recently updated field might be selected by a field level rule. Further, record and/or field level rules might be associated with source reliability. That is, the record that originated in a preferred source system might be selected as a master data record. Note that at the field level different sources might be preferred for different fields.

Note that survivorship rules may part of the matching strategy definition, and a system might support selection criteria in the granularity described herein. In a mixed strategy situation, the record level survivorship rules may be applied first and then the field level rules are applied. In some embodiments, a single record level consolidation rule is used while multiple field level rules are applied in a given merge case. In other cases, it may be possible to define rules that set value based on other field's values (e.g., if a gender field is empty and a title field equals "Mr.," then set the gender field of the resulting merged record to "Male"). That is, the master data program may enrich the merged record and create an improved record representation.

The visualization described herein may help a data steward or other user justify an investment in a master data management program, by materializing the added value of customer data processing in a master data service as an enabler of a single, accurate view of customers and better analytics that may be based on trusted customer information. Moreover, the displays may help a company identify trends and patterns associated with a business. According to some embodiments, a data steward, who may be an employee responsible for the overall data quality in a master data services environment, may receive a visualization that summarizes the processes the data went through and the impact of those processes on sales data analysis. For example, the displays could potentially direct the steward effort on which data to work on first (e.g., a data steward's work flow might be prioritized based on an analysis of customer levels and associated sales data). Moreover, a marketing manager may receive and utilize interfaces that display the impact of consolidation on sales analysis. In addition by doing the types of analysis described herein, embodiments may simulate how a marketing manager uses the data, and the data steward could make sure that the data fits the purposes of an enterprise and deliver a fluid analysis experience to a marketing manager. Moreover, a marketing manager may not need to worry about the quality of the data, but instead focus on analyzing and learning from the data itself (e.g., in accordance with MDM analytics).

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to particular types of data, note that embodiments may be associated with other types of information. For example, manufacturing data, shipping status, sales orders, financial information, and health data may be processed in accordance with any of the embodiments described herein.

Moreover, while embodiments have been illustrated using particular series of steps, embodiments may be implemented in any other of a number of different ways. For example, a first set of field level rules might be applied, followed by a record level selection of a master record (and potentially then other field level rules might be applied to the master record). Similarly, the bar charts described herein are only one way of visualizing the data and other approaches may be applied instead. For example, a historical graph showing changes to a number of records after repeated applications of consolidation processes might be displayed to the user.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer implemented method, comprising:
receiving, at a computer processor of a master data services platform, an original set of records;
automatically transforming, by the computer processor of the master data services platform, the original set of records into a transformed set of records that combines multiple records referring to a single entity into a single record by identifying potential duplicates, the transforming based on determining (i) records with a highest number of populated fields or (ii) records having a most frequently occurring combination of values across fields within the multiple records and merging the identified potential duplicates records into a single best representing instance of the record; and
generating a visualization display to visualize an impact of a distribution process related to an amount of sales, an amount of profit, or a number of purchase orders in real-time, the impact based on a reduction in records, the visualization display including (i) a first graphical representation being divided into regional distribution sub-categories prior to the reduction in records and (ii) a second graphical representation being divided into the regional distribution sub-categories to illustrate a change in regional distribution based on the reduction in records while not changing the overall amount of sales, profit or purchase orders wherein the first graphical representation and the second graphical representation are each divided into sub-representations associated with customer levels and wherein a data steward's work flow is prioritized based on an analysis of customer levels and associated sales data.

2. The method of claim 1, wherein the original set of records are received from a customer information platform.

3. The method of claim 1, wherein said transforming is further associated with a record enrichment process.

4. The method of claim 1, wherein the visualization display is updated in substantially real time.

5. The method of claim 1, wherein the first graphical representation and the second graphical representation are each divided into sub-representations associated with geographic locations.

6. The method of claim 1, wherein the first graphical representation and the second graphical representation are each divided into sub-representations associated with demographic attributes.

7. The method of claim 1, wherein the original set of records include records from a plurality of data sources.

8. The method of claim 1, wherein said generating is associated with a business user data analysis tool.

9. A non-transitory, computer-readable medium storing program code executable by a computer to:
receive, at a master data services platform, an original set of records;
automatically transform, by the master data services platform, the original set of records into a transformed set of records that combines multiple records referring to a single entity into a single record by identifying potential duplicates, the transforming based on determining (i) records with a highest number of populated fields or (ii) records having a most frequently occurring combination of values across fields within the multiple records and merging the identified potential duplicates records into a single best representing instance of the record; and
generate a visualization display to visualize an impact of a real-time reduction in records associated with a distribution process related to an amount of sales, an amount of profit, or a number of purchase orders, the visualization display including (i) a first graphical representation being divided into regional sales distribution sub-categories prior to the real-time reduction in records and (ii) a second graphical representation being divided into the regional sales distribution sub-categories to illustrate a change in regional sales distribution based on the reduction in records while not changing the overall amount of sales, profit or purchase orders wherein the first graphical representation and the second graphical representation are each divided into sub-representations associated with customer levels and wherein a data steward's work flow is prioritized based on an analysis of customer levels and associated sales data.

10. The medium of claim 9, wherein the original set of records are received from a customer information platform.

11. The medium of claim 9, wherein said automatic transformation is associated with: (i) a record consolidation process, and (ii) a record enrichment process.

12. The medium of claim 9, wherein the first graphical representation and the second graphical representation are each divided into sub-representations associated with at least one of: (i) geographic locations, (ii) customer levels, and (iii) demographic attributes.

13. The medium of claim 9, wherein the original set of records include records from a plurality of data sources.

14. The medium of claim 9, wherein said generating is associated with a business user data analysis tool.

15. A system, comprising:
an original data store to provide a plurality of original records; and
a master data services platform comprising a computer processor to:
receive the original set of records;
automatically transform the original set of records into a transformed set of records that combines multiple records referring to a single entity into a single record by identifying potential duplicates, the transforming based on determining (i) records with a highest number of populated fields or (ii) records having a most frequently occurring combination of values across fields within the multiple records and merging the identified potential duplicates records into a single best representing instance of the record; and
generate a visualization display to visualize an impact of a real-time reduction in records associated with a distribution process related to an amount of sales, an amount of profit, or a number of purchase orders, the visualization display including (i) a first graphical representation being divided into regional sales distribution sub-categories prior to the real-time reduction in records and (ii) a second graphical representation being divided into the regional sales distribution sub-categories to illustrate a change in regional sales distribution based on the reduction in records while not changing the overall amount of sales, profit or purchase orders wherein the first graphical representation and the second graphical representation are each divided into sub-representations associated with customer levels and wherein a data stewards work flow is prioritized based on an analysis of customer levels and associated sales data.

16. The system of claim 15, wherein said automatic transformation is associated with at least one of: (i) a record consolidation process, and (ii) a record enrichment process.

17. The system of claim 15, wherein the original data store is associated with a customer information platform.

18. The system of claim 15, further comprising:
a business user data analysis tool, wherein said generating including transmitting information from the master data services platform to the business user data analysis tool.

* * * * *